No. 850,438. PATENTED APR. 16, 1907.
M. J. MILLER.
CURRENT WHEEL.
APPLICATION FILED JULY 14, 1906.

2 SHEETS—SHEET 1.

Witnesses
Inventor
Magnus J. Miller

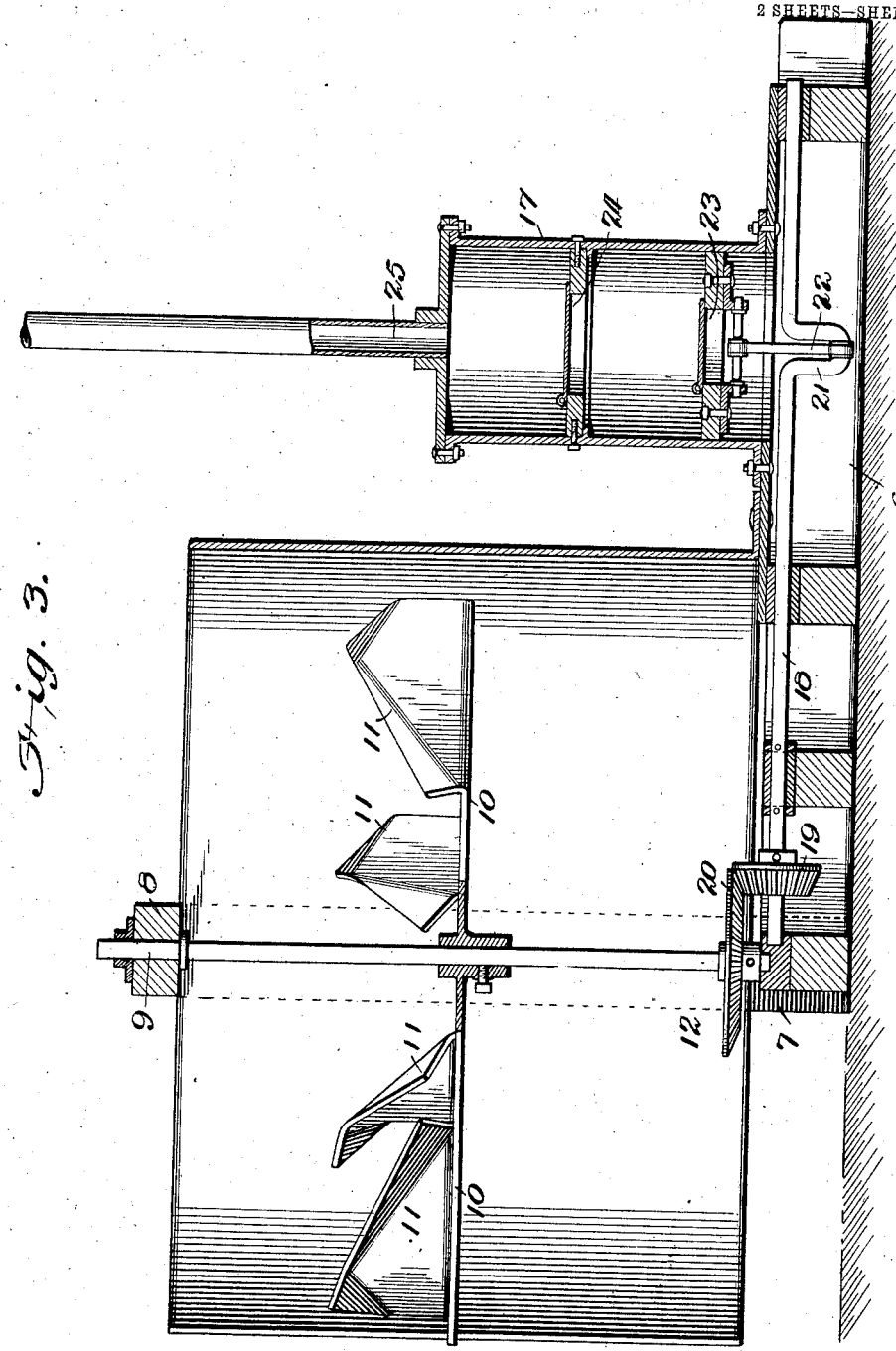

UNITED STATES PATENT OFFICE.

MAGNUS JOHNSEN MILLER, OF GRANGER, WYOMING.

CURRENT-WHEEL.

No. 850,438.  Specification of Letters Patent.  Patented April 16, 1907.

Application filed July 14, 1906. Serial No. 326,271.

*To all whom it may concern:*

Be it known that I, MAGNUS JOHNSEN MILLER, a citizen of the United States, residing at Granger, in the county of Sweetwater and State of Wyoming, have invented new and useful Improvements in Current-Wheels, of which the following is a specification.

This invention is a water-wheel designed to be operated by a current and intended to be submerged in the water.

One of the novel features is an induction-pipe, which causes the water to strike the wheel with greater force than would otherwise be the case, said induction-pipe leading downwardly from near the surface of the water and properly situated to cause the flow therethrough to strike the blades of the wheel.

Figure 1:
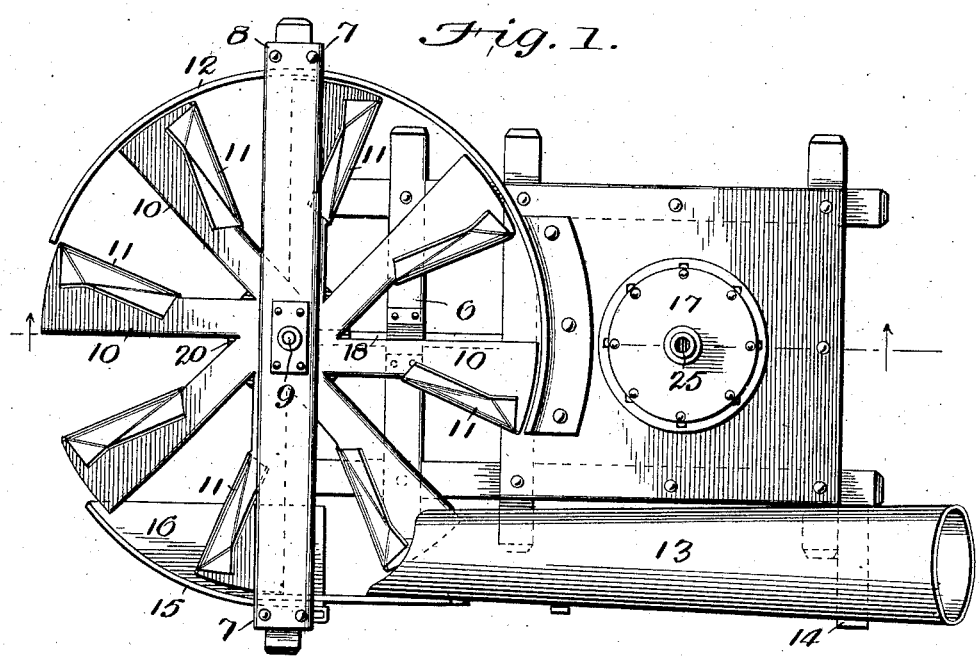
Figure 2:
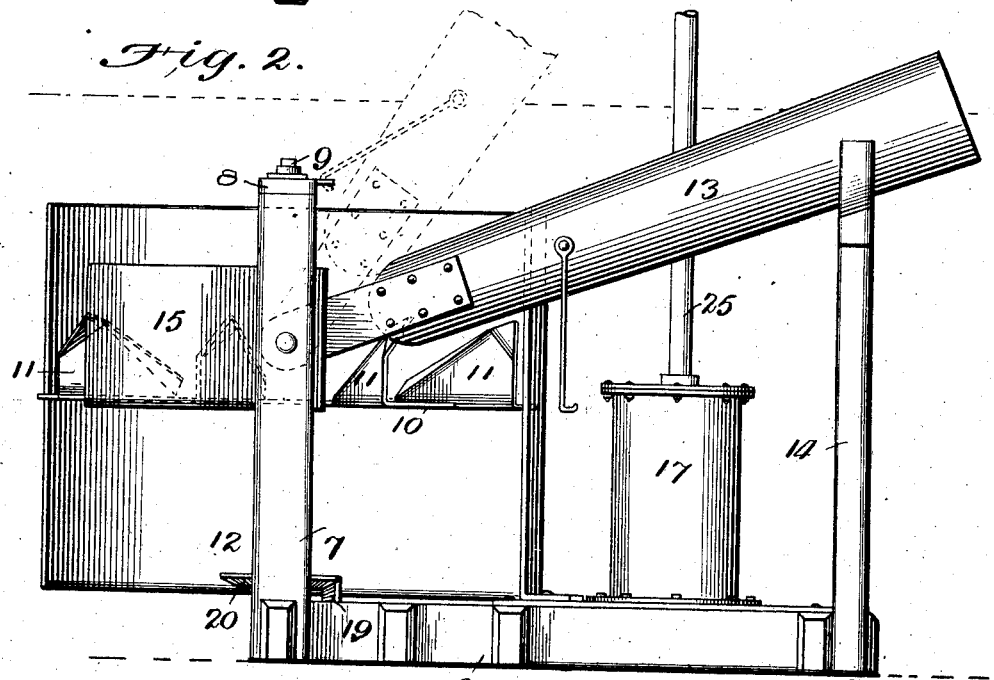

In the accompanying drawings, Figure 1 is a top view of the machine. Fig. 2 is a side elevation. Fig. 3 is a vertical section.

Referring specifically to the drawings, 6 indicates a base-frame, suitably formed of sills of proper size and shape to support the other parts of the structure. Mounted upon this frame are two uprights 7 with a cross-bar 8 at the top. The vertical shaft 9 of the wheel is suitably carried in bearings in said cross-bar and in one of the sills of the base-frame.

The wheel rotates horizontally—that is, on a vertical axis—and consists of a series of blades having a flat horizontal portion (indicated at 10) and an upturned lap or flange 11 at one edge of said portion. The wheel and blades are preferably made of sheet metal cut and bent to the shape shown and described. This wheel, as stated, is mounted upon the shaft 9. The wheel is protected on one side by an apron 12, extending around substantially half of the wheel, being that portion which travels against the current as the wheel revolves. Said apron serves to prevent the full force of the current striking said blades as they turn.

At 13 is indicated a downwardly-inclined tapering chute or funnel, the large or upper end of which is directed up the stream and the small or discharge end of which is preferably positioned to cause the water which flows through the funnel to strike the blades of the wheel. This induction chute or pipe is supported upon one of the uprights 7 at its lower end and upon an upright 14 at its upper end.

At 15 is a curved apron mounted upon one of the uprights 7 beyond the mouth of the chute 13, and said apron has a horizontal portion 16 projecting under the wheel. The apron and its projecting portion serves to hold the water to the blades and prevent the too free escape therefrom after the impact.

The wheel is shown geared to a pump 17, mounted upon the base-frame, said gearing consisting of a counter-shaft 18, having at one end a gear 19, meshing with a corresponding gear 20 on the main shaft and also having at the other end a crank 21, connected to the pump-rod 22, which operates the lower valve 23 in the pump-barrel 17. An upper valve is indicated at 24 and a discharge-pipe at 25, which may be extended to carry the water to any desired place.

In use the machine is set in the bed of the stream, with the wheel and all parts submerged. The flowing water strikes the wheel, as well as the water entering through the tapered induction-pipe 13, which, as said before, is preferably located near the surface of the water. The force of the water causes the wheel to rotate, and by means of the gearing shown the pump is operated. Obviously the power generated could be applied to any other use desired; but the invention will be found particularly useful in irrigating ditches, where it is desired to lift water from the ditch by means of power generated by the ditch itself. The induction-pipe 13 is connected to the standard 7 by a pivot-bolt, so that the pipe can be swung up to vertical position, and consequently put out of action when desired.

I claim—

1. The combination with a current water-wheel constructed and adapted to be submerged, of a pivoted induction-pipe adapted to be submerged and leading to said wheel and discharging at its small end against the same and arranged to be swung up on its pivot to vary its inclination.

2. In combination, a horizontal current water-wheel constructed and arranged to be submerged, and a tapered induction-pipe adapted to be submerged and extending at an incline downwardly toward said wheel, the blades of the wheel being inclined to receive the impact of the discharge from said pipe, and the pipe being adjustable to vary its inclination, and to render it inoperative by lifting its inlet end above the surface of the water.

3. In combination, a frame, a horizontal submerged current-wheel therein, a pump mounted on the frame beside the wheel, having a casing submerged and open at its lower end, and with a discharge-pipe leading from its upper end, and a counter-shaft geared to
5 the wheel-shaft and having a crank under said casing connected to the pump-rod.

In testimony whereof I have signed my name to this specification in the presence of subscribing witnesses.

MAGNUS JOHNSEN MILLER.

Witnesses:
 Mrs. FRED ANDERSON,
 J. B. WARRENN,
 B. H. SMALLEY.